US011936129B2

(12) United States Patent
Kraenzlein et al.

(10) Patent No.: US 11,936,129 B2
(45) Date of Patent: Mar. 19, 2024

(54) RIBBON CABLE CONNECTOR WITH A CLAMPING DEVICE

(71) Applicant: TE Connectivity Germany GmbH, Bensheim (DE)

(72) Inventors: Harald Kraenzlein, Woert (DE); Stefan Raab, Woert (DE); Marina Hertlein, Woert (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/576,340

(22) Filed: Jan. 14, 2022

(65) Prior Publication Data

US 2022/0224033 A1 Jul. 14, 2022

(30) Foreign Application Priority Data

Jan. 14, 2021 (DE) ......................... 102021100679.1

(51) Int. Cl.
*H01R 12/77* (2011.01)

(52) U.S. Cl.
CPC .................................. *H01R 12/774* (2013.01)

(58) Field of Classification Search
None
See application file for complete search history.

(56) References Cited

U.S. PATENT DOCUMENTS 3,989,336 A * 11/1976 Rizzio, Jr. .............. H01R 12/62 439/456
4,900,269 A * 2/1990 Lynch .................... H01R 12/79 439/499
5,871,369 A 2/1999 Obayashi et al.
2004/0235339 A1 11/2004 Sato et al.

FOREIGN PATENT DOCUMENTS

AT 41 272 B 7/1989
CN 201117868 Y 9/2008
DE 100 45 714 A1 5/2001
DE 10 2004 062 846 A1 8/2005
DE 10 2012 012 087 A1 12/2013
DE 10 2018 120 480 A1 2/2020

(Continued)

OTHER PUBLICATIONS

Definition of "bulge" Google, dated Feb. 6, 2023.*

(Continued)

*Primary Examiner* — Ross N Gushi
(74) *Attorney, Agent, or Firm* — Barley Snyder

(57) ABSTRACT

A ribbon cable connector is fixed at an end of a ribbon cable. The ribbon cable has a plurality of electrical conductors extending parallel and distanced to one another. The ribbon cable connector includes an insertion slot extending in a plugging direction and receiving the ribbon cable, a plurality of contact element receptacles extending parallel and distanced to one another, a plurality of structures in the insertion slot extending parallel to one another and aligned with the contact element receptacles, and a clamping device configured to clamp the ribbon cable in the insertion slot. An end of the insertion slot inside of the ribbon cable connector adjoins the contact element receptacles in the plugging direction. The structures are each separated from one another by a partition wall.

19 Claims, 7 Drawing Sheets

(56) References Cited

FOREIGN PATENT DOCUMENTS

| | | | |
|---|---|---|---|
| EP | 0747996 | A2 | 12/1996 |
| EP | 1923962 | A1 | 5/2008 |
| EP | 3570379 | A1 | 11/2019 |
| JP | 2004-55 391 | A | 2/2004 |
| JP | 2008186706 | A | 8/2008 |

OTHER PUBLICATIONS

Definition of "bulge" Dictionary.com, dated Feb. 6, 2023.*
German Office Action, App. No. 102021100679.1, dated Jul. 1, 2021, 8 pages.
Extended European Search Report, Application No. 22151164.5-1201, dated Jun. 2, 2022, 7 pages.
Indian Examination Report, Application No. 202244001251, dated Aug. 4, 2022, 5 pages.
Chinese First Office Action dated Oct. 25, 2023 with English translation, corresponding to Application No. 202210026657.X, 19 pages.

* cited by examiner

RIBBON CABLE CONNECTOR WITH A CLAMPING DEVICE

CROSS-REFERENCE TO RELATED APPLICATIONS

This application claims the benefit of the filing date under 35 U.S.C. § 119(a)-(d) of German Patent Application No. 102021100679.1, filed on Jan. 14, 2021.

FIELD OF THE INVENTION

The invention relates to a ribbon cable connector which is configured to be fixed at one end of a ribbon cable that comprises multiple electrical conductors extending parallel and distanced to one another.

BACKGROUND

In a ribbon cable, several electrical conductors extend parallel to each other, wherein they are applied to a common insulation. Ribbon cables are often used for transmitting signals, for which they are also attached to ribbon cable connectors. In this context, the ribbon cables should occupy as little space as possible. However, miniaturization of the ribbon cable is accompanied by a risk of unwanted transmission of signals due to current flow between the parallel conductors, since the leakage path between directly adjacent conductors also decreases.

SUMMARY

A ribbon cable connector is fixed at an end of a ribbon cable. The ribbon cable has a plurality of electrical conductors extending parallel and distanced to one another. The ribbon cable connector includes an insertion slot extending in a plugging direction and receiving the ribbon cable, a plurality of contact element receptacles extending parallel and distanced to one another, a plurality of structures in the insertion slot extending parallel to one another and aligned with the contact element receptacles, and a clamping device configured to clamp the ribbon cable in the insertion slot. An end of the insertion slot inside of the ribbon cable connector adjoins the contact element receptacles in the plugging direction. The structures are each separated from one another by a partition wall.

BRIEF DESCRIPTION OF THE DRAWINGS

The invention will now be described by way of example with reference to the accompanying Figures, of which.

DETAILED DESCRIPTION OF THE EMBODIMENT(S)

In the following, the invention is exemplarily described in more detail by way of embodiments. Features of the embodiments can be omitted if the technical effect associated with these features is not important for a particular application. Conversely, further features can also be added to the embodiments if their technical effect should be important for a particular application. In the following, the same reference signs are used for features that correspond to each other in terms of function and/or spatial-physical configuration.

Initially, a first exemplary configuration of a ribbon cable connector 1 according to the invention is explained in more detail with reference to FIGS. 1 to 4. The ribbon cable connector 1 is configured to be attached to one end 2 of a ribbon cable 4 in a connector assembly 100.

Figure 1:
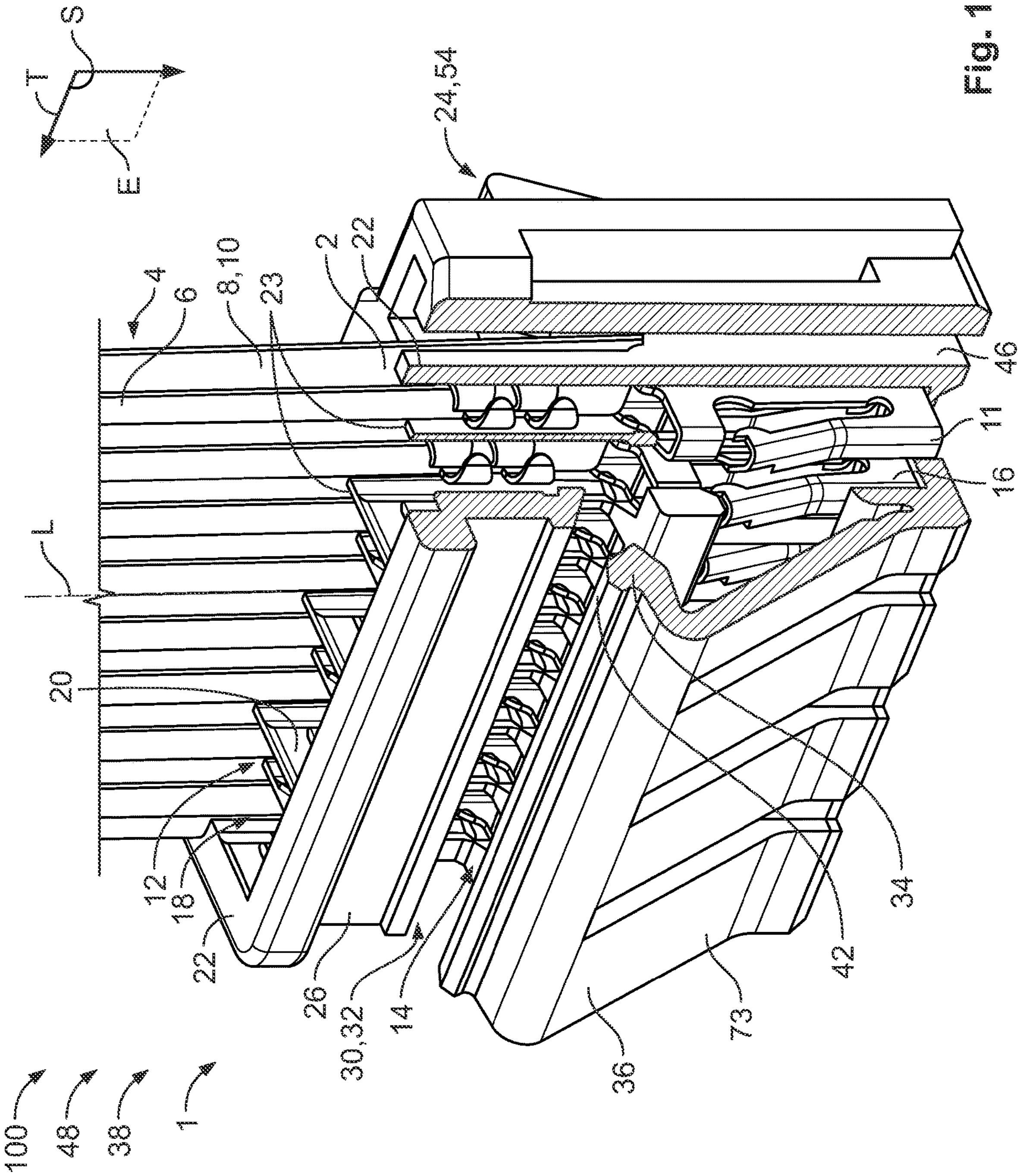
FIG. 1 is a sectional perspective view of a connector assembly according to an embodiment in a release position.

As shown in FIG. 1, the ribbon cable 4 has several electrical conductors 6 extending parallel and distanced to one another, which may be applied to a common insulation 8, for example an insulating carrier film 10. The insulation 8 is exposed between the adjacent conductors 6. Alternatively, the conductors 6 may be surrounded by an insulating sheath, being at least partially exposed from the insulating sheath at the end 2. In particular, the conductors 6 may extend parallel to a cable longitudinal axis L of the ribbon cable 4 and may be spaced apart from each other in a transverse direction T extending substantially perpendicular to the cable longitudinal axis L.

As shown in FIG. 1, the conductors 6 can each be connected to a contact element 11 at the end 2, for example by crimping. Particularly in the case of miniaturized ribbon cables 4, the distances between the conductors 6 can be small. For example, they may be smaller than 1 mm, smaller than 0.5 mm or even smaller than 0.4 mm. Consequently, a leakage path between the conductors 6 may be such that an unwanted signal transmission may occur due to current flow between the conductors 6. Cuts or punch-outs in the insulation 8 between the conductors 6 are also undesirable, since this is associated with a higher production cost and this processing of the insulation 8 is not possible, especially for miniaturized ribbon cables 4.

With a ribbon cable connector 1 according to the invention, it is now possible to fix one end 2 of the ribbon cable 4 between the conductors 6 without any cuts or punch-outs in the insulation 8. For this purpose, the ribbon cable connector 1 has an insertion slot 12 shown in FIG. 1 extending into the ribbon cable connector 1 in a plugging direction S extending substantially parallel to the cable longitudinal axis L for receiving the end 2 of the ribbon cable 4. In this context, the insertion slot 12 adjoins contact element receptacles 16, which are spaced apart from one another and extend parallel to one another, with its end 14, which is located in the ribbon cable connector 1, in the plugging direction S.

As shown in FIG. 1, the insertion slot 12 has structures 18 which are aligned with the contact element receptacles 16 in the plugging direction S, extend parallel to one another and in the direction transverse to the plugging direction S, in particular in the direction transverse to the plugging direction S and to the transverse direction T, and are each separated from one another in the transverse direction T by a partition wall 20. The plugging direction S and transverse direction T span a frontal plane E which, for example in FIG. 2, extends substantially perpendicular to the drawing plane. The structures 18 on the outside in the transverse direction T can each be closed in the transverse direction T by a side wall 22 extending parallel to the partition wall 20. In an embodiment, the wall 20 can extend continuously in the transverse direction T so that the structures 18 are bounded by a common wall.

The partition walls 20 effect a deflection of the leakage path 23 around the corresponding partition wall 20 between the adjacent conductors 6 and thus lengthen the leakage path 23 so that a safe application of the ribbon cable connector 1 can be ensured without an unwanted transmission of signals between the individual conductors 6. In FIG. 1, the leakage path 23 is shown in simplified form by a dashed line.

To fasten the ribbon cable 2 in the ribbon cable connector 1, a clamping device 24 is further provided, which is configured to clamp the ribbon cable 2 in the insertion slot 12. Therefore, the ribbon cable 4 can be additionally secured against falling out in the connector assembly 100. A tensile load of the ribbon cable 2 is damped by the clamping device 24, whereby the contacting of the contact elements 11 and the corresponding conductors 6 remains unaffected by this tensile load. Consequently, the contact element 11 can be prevented from breaking off.

Figure 2:
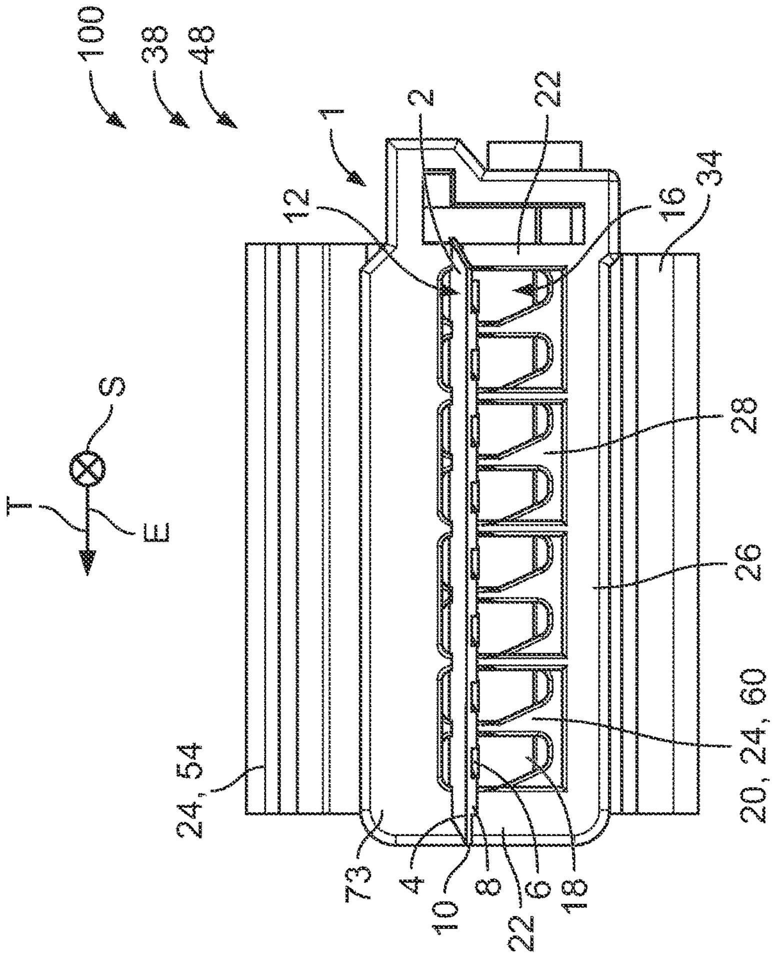
FIG. 2 is a top view of the connector assembly of FIG. 1.

As shown in FIG. 2, the insertion slot 12 can extend over its entire width substantially parallel to the transverse direction T of the ribbon cable 4 intended for this ribbon cable connector 1, whereby the ribbon cable 4 can be easily received along its longitudinal axis L in the insertion slot 12. Consequently, no further processing steps are necessary to enable the end 2 of the ribbon cable 4 to be partially received.

The partition walls 20 or also the side walls 22 can close the insertion slot 12 in the plugging direction S at the end 14 so that the ribbon cable 4 can be prevented from being inserted too deeply into the ribbon cable connector 1. In an embodiment, the partition walls 20 can extend in the plugging direction S up to the contact element receptacles 16, whereby the partition walls 20 extend along the entire depth of the insertion slot 12 in the plugging direction S. In an embodiment, the partition walls 20 of the insertion slot 12 can seamlessly merge into partition walls 20 between the contact element receptacles 16. Thus, the respective pairs of partition walls 20 can be molded integrally with each other, for example as an injection-molded part.

structures 18 and contact element receptacles 16 can each be assigned to a conductor 6 so that an individual conductor 6 can be arranged in each structure 18. In an embodiment, the structure 18 can extend substantially transversely to the frontal plane E. This allows insertion of the conductors 6 after termination with the respective contact elements 11. In an embodiment, a cross-section transverse to the frontal plane E of a structure 18 can overlap or even coincide with a cross-section of the corresponding contact element receptacle 16, as can be seen in FIG. 2. Consequently, the respective conductor 6 of the ribbon cable 4 can already be terminated at a contact element 11, for example a contact socket, before being inserted into the insertion slot 12. The contact element 11 can simply be inserted with the ribbon cable 4 through the respective structure 18 into the corresponding contact element receptacle 16.

A wall 26 may be provided to limit the protrusions 18 in the direction transverse to the frontal plane E. The wall 26 can extend in the transverse direction T over the entire width of the insertion slot 12, as shown in FIGS. 1 and 2.

The partition walls 20 or also the side walls 22 can in this case project from the wall 26 substantially transversely to the frontal plane E. If the stability of the partition walls 20 and the side walls 22 is to be reinforced, for example against bending, the partition walls 20 and the side walls 22 can have an increasing material thickness in the transverse direction T in the direction transverse to the frontal plane E. The material thickness of the partition walls 20 and the side walls 22 can be increased in the transverse direction T. For this purpose, for example, reinforcing ribs 28, shown in FIG. 2, can be provided which extend from the wall 26 to a flat side of the respective partition wall 20 or side wall 22 facing in the direction of the corresponding structure 18.

The end of the respective partition walls 20 facing away from the wall 26 may have a material thickness smaller than the distance between the conductors 6 of the ribbon cable so that it can be ensured that the partition walls 20 are opposite the section of insulation 8 exposed from the conductors 6 when the ribbon cable 4 is plugged into the ribbon cable connector 1.

The structures 18 and the contact element receptacles 16 may be spaced apart from one another in the plugging direction S, and the region 30 may be open substantially transversely to the frontal plane E. Thus, the region 30 can form a receiving pocket 32 shown in FIGS. 1 and 3 in which, for example, a secondary latch 34 can be received. The secondary latch 34 may be held by a lever arm 36 formed on the ribbon cable connector 1 so as to be pivotable about a rotation axis aligned substantially parallel to the transverse direction T.

Figure 3:
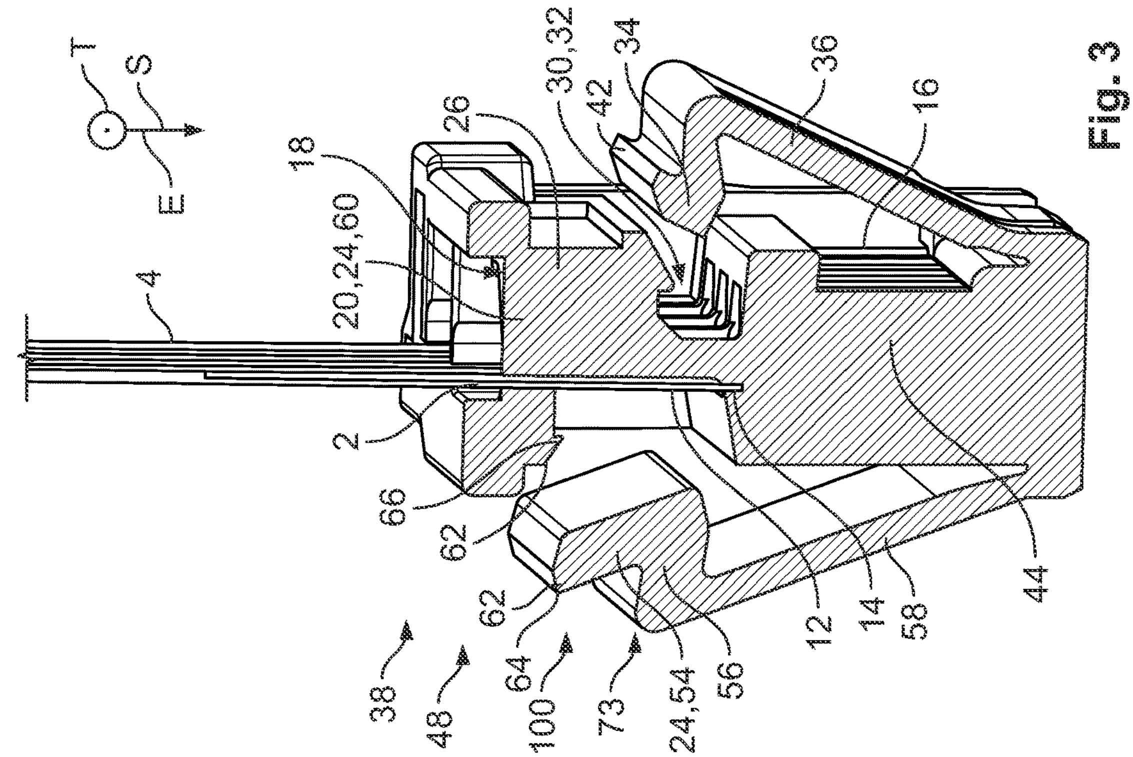
FIG. 3 is a sectional perspective view of the connector assembly of FIG. 1.
Figure 4:
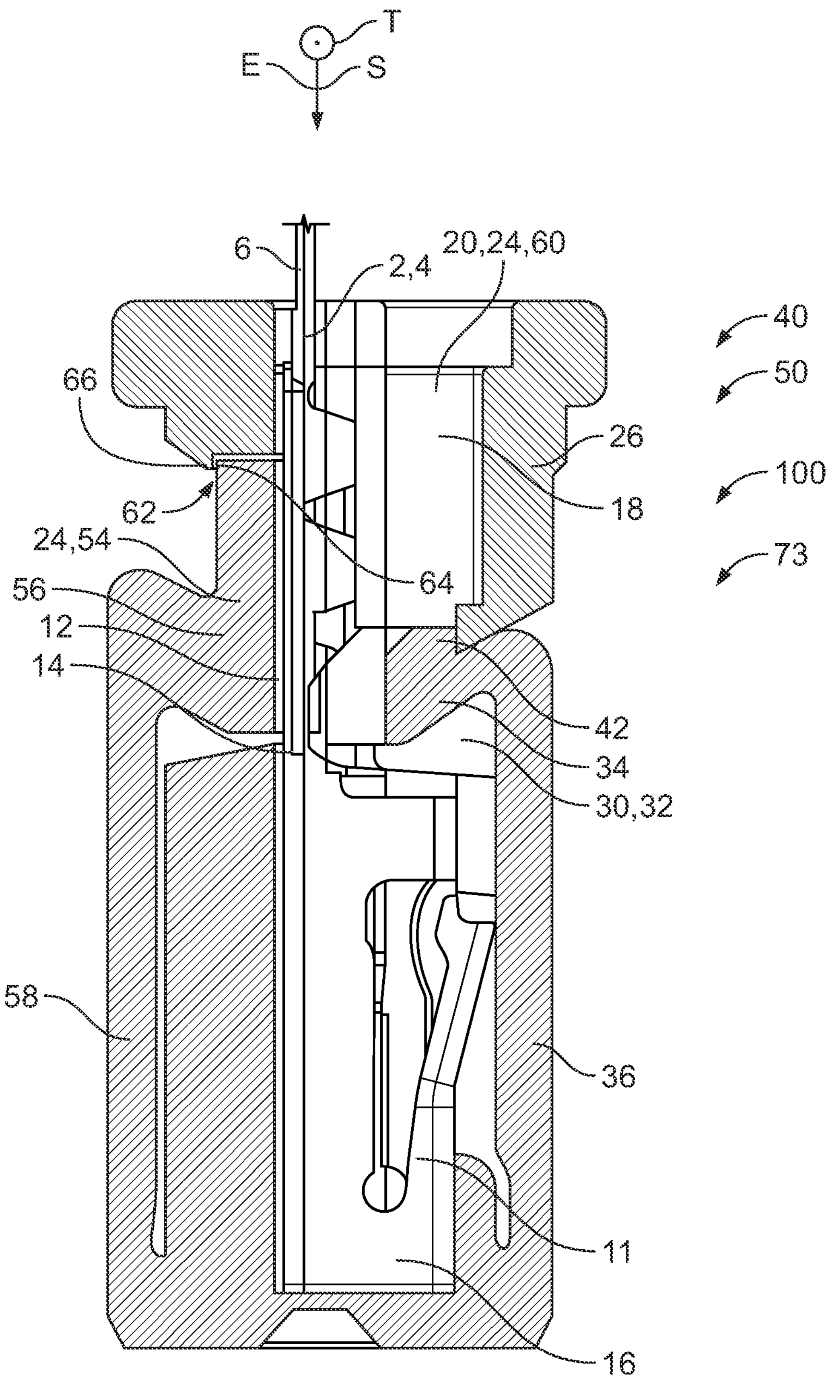
FIG. 4 is a sectional side view of the connector assembly of FIG. 1 in a clamping position.

In FIGS. 1 to 3, the secondary latch 34 is shown in an open position 38 in which it is arranged outside the receiving pocket 32. In this open position 38, the contact element receptacles 16 are released and the corresponding contact elements 11 can be inserted into the contact element receptacles 16. If the secondary latch 34 is now transferred to a locking position 40, as shown in FIG. 4, the secondary latch 34 protrudes into the receiving pocket 32 and covers the contact element receptacles 16. Consequently, the secondary latch 34 blocks the contact elements 11 from falling out or being pulled out of the contact element receptacles 16.

In an embodiment, the secondary latch 34 can be locked in the locking position 40, for example by latching with the wall 26, as can be seen in FIG. 4. For this purpose, the secondary latch 34 can have a latching projection 42 which, in the locking position 40, abuts the wall 26 and prevents the secondary latch 34 from pivoting out of the receiving pocket 32 in a form-fitting manner.

To deflect the leakage path between the adjacent conductors 6 in the region 30 as well, the partition walls 20 or also the side walls 22 project beyond the structures 18 in the plugging direction S and extend as far as the contact element receptacles 16. In particular, the partition walls 20 and the side walls 22 can merge into partition walls 44 between the contact element receptacles 16 or the side walls 46 bounding the outer contact element receptacles 16. In this case, the partition walls 20 can be narrowed transversely to the plugging direction S, in particular transversely to the frontal plane E, in the region between structures 18 and contact element receptacles 16.

In an embodiment, the respective partition walls 20 can form part of the clamping device 24, at least in sections. Consequently, it can be ensured that clamping of the ribbon cable 4 takes place in the region between the conductors 6. This prevents the conductors 6 from being damaged by the clamping. In addition, clamping with the partition walls 20 extends an air gap between the adjacent conductors 6. The air gap no longer merely leads in a transverse direction T from one conductor 6 to the adjacent conductor 6, but extends around the respective partition wall 20 between the conductors 6. In this exemplary configuration, the partition walls 20 serve both to clamp the ribbon cable 4 and to insulate the adjacent conductors 6 from one another.

If the secondary latch 34 is to be continuous along the transverse direction T, as is the case in the first exemplary configuration, the partition walls 20 may be narrowed in the region 30 substantially transversely to the frontal plane E, in particular in the direction toward the insertion slot 12.

Now, with reference to FIGS. 3 and 4, the clamping device 24 of the first exemplary configuration is described in more detail.

The clamping device 24 may comprise a pressing element 54 movable from a release position 48 (FIGS. 1 to 3) to a clamping position 50 (FIG. 4) and lockable in the clamping position 50. In this exemplary configuration, the pressing element 54 is formed on a free end 56 of a lever arm 58 which is held pivotably about a rotation axis aligned substantially parallel to the transverse direction T.

In an embodiment, the lever arm 58 with the pressing element 54 and the lever arm 36 with the secondary latch 34 may be arranged on opposite sides of the ribbon cable connector 1 substantially transversely with respect to the transverse direction T. In particular, the partition walls 20 and the pressing element 54 can be arranged on different sides with respect to the insertion slot 12. The pressing element 54 may be configured to bound the insertion slot 12 substantially transversely to the frontal plane and to be opposite the partition walls 20 and the side walls 22, at least in the clamping position 50.

In the clamping position 50 shown in FIG. 4, a clear width of the insertion slot 12 in the direction transverse to the frontal plane E can be smaller than in the release position 48. The clear width can, for example, be greater than the material thickness of the ribbon cable 4 or at least of the insulation 8. Thus, the ribbon cable 4 can be inserted into the insertion slot 12 without great resistance in the release position 48. In the clamping position 50, the clear width of the insertion slot 12 may be smaller than the material thickness of the ribbon cable 4, in particular the material thickness of the insulation 8. Consequently, in the clamping position 4, the ribbon cable 4 may be pressed with high force by the pressing element 54 against a counter-holder element 60, which in this exemplary configuration is formed by the partition walls 20 and the side walls 22.

The clamping device 24 can limit the insertion slot 12 essentially transversely to the frontal plane E, in particular on both sides, at least in sections. For this purpose, the pressing element 54 and the counter-holder element 60 can lie opposite each other with respect to the insertion slot 12.

If the partition walls 20 form the pressing element 54 at least in sections, the corresponding sections of the partition walls 20 can be integrally connected to one another on a module that is movable in the plugging direction in order to implement a synchronous, in particular simultaneous, movement of the corresponding sections of the partition walls 20. The movable portion can slide along a run-up slope in the plugging direction S, via which a translation of the movement in the plugging direction S to a movement transverse to the plugging direction S, in particular transverse to the frontal plane E, takes place.

Accordingly, the ribbon cable 4 is only clamped in the region of the insulation 8 between the conductors 6. Instead of being clamped, the conductors 6 can move into the corresponding structures 18 and are thus protected from any stress caused by the clamping.

A latching mechanism 62 can be provided for locking the pressing element 54 in the clamping position 50. For this purpose, the pressing element 54 can have a latching lug 64 projecting essentially against the plugging direction S, which engages in a complementary latching lug 66 in the clamping position 50, as shown in FIG. 4.

As shown in FIG. 4, the clamping device 24 may be level with the structures 18, at least in sections, in the plugging direction S. Consequently, the clamping of the ribbon cable 4 can be further stabilized by the wall 26.

To achieve a gentle and stable clamping, the clamping device 24 may extend substantially parallel to the plugging direction S over at least half of a depth of the insertion slot 12. In an embodiment, the clamping device 24 can extend over at least two thirds of the depth of the insertion slot 12 or even over the entire depth of the insertion slot 12. The clamping device 24 can extend essentially perpendicular to the plugging direction S, in particular perpendicular to the transverse direction T over the entire width of the ribbon cable 4 or the insertion slot 12. Thus, the clamping force can be distributed over a large area and there is no punctual loading of the ribbon cable 4.

The solution according to the invention allows the ribbon cable 4 to be inserted into the insertion slot 12, wherein the combination of the clamping device 24 and the structures 18 separated from each other by the partition walls 20 ensure a secure fixation of the ribbon cable 4 in the insertion slot 12 with an increased leakage path 23 between adjacent conductors 6. The leakage path 23, i.e. the shortest distance along the surface of the insulation 8 between two conductive parts 6, is no longer the perpendicular to the longitudinal axis L of the cable 4 between the adjacent, parallel conductors 6, since this path is blocked by the partition wall 20. Therefore, the leakage path 23 extends around the partition wall 20, lengthening it compared to the leakage paths in conventional ribbon cable connectors. Furthermore, processing of the end 2 of the ribbon cable 4, such as cutting slots in the insulation 8 between the conductors 6, can be avoided to allow insertion of the ribbon cable 4 into the ribbon cable connector 1. If the ribbon cable 4 had to be processed, a minimum width of the insulation 8 between the conductors 6 that allows processing would be mandatory. Consequently, miniaturization of the ribbon cable 4 would be limited by the minimum width.

With the clamping device 24, not only is the correct positioning of the ribbon cable 4 in the insertion slot 12 protected against displacement due to a tensile load, but also the vibration resistance of the connector assembly 100, comprising the ribbon cable connector 1 and the ribbon cable 4, can be improved.

Figure 5:
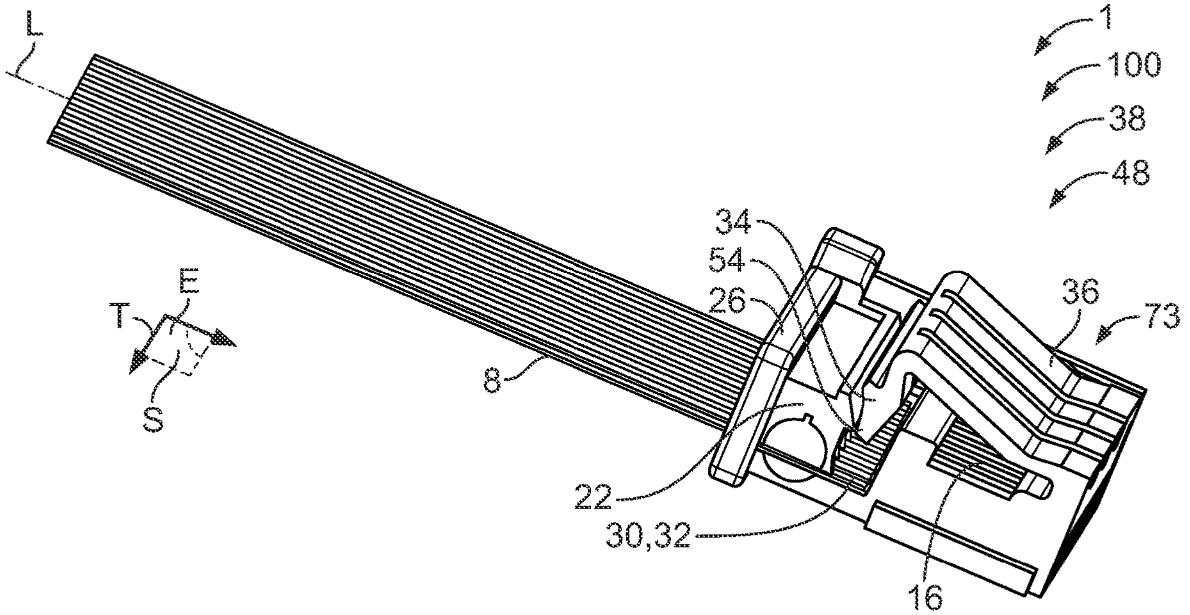
FIG. 5 is a perspective view of a connector assembly according to another embodiment in a release position.
Figure 6:
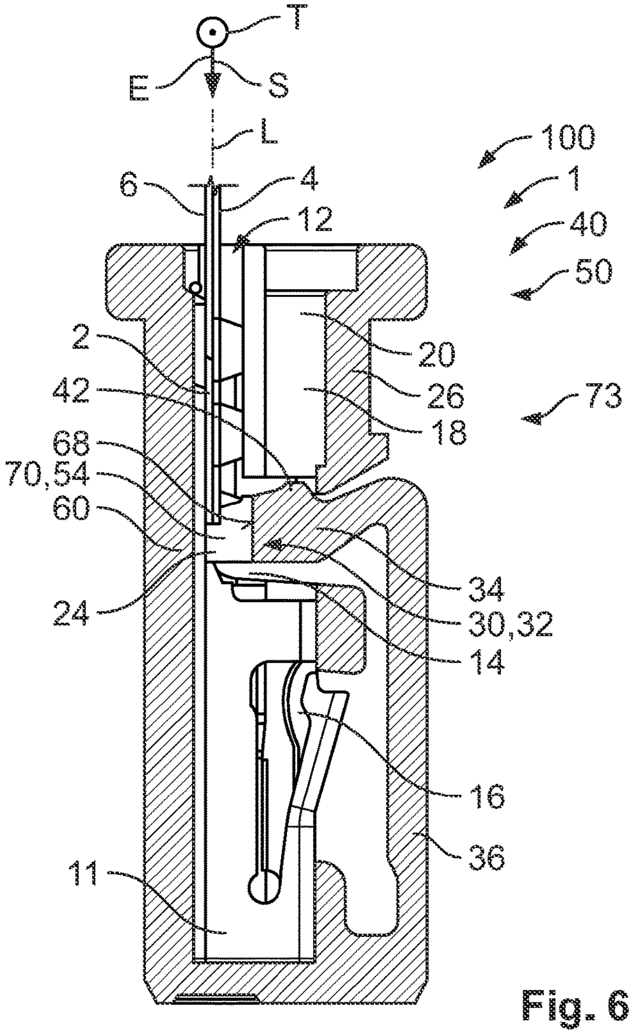
FIG. 6 is a sectional side view of the connector assembly of FIG. 5 in a clamping position.

FIGS. 5 and 6 show a second exemplary configuration of a ribbon cable connector 1 according to the invention, which is of particularly compact structure compared to the first exemplary configuration. For the sake of brevity, only the differences of the second configuration compared to the first configuration are discussed below.

According to the second configuration, the pressing element 54 may be formed by the secondary latch 34. Consequently, a second lever arm is no longer provided. By moving the secondary latch 34 from the open position 38 (FIG. 5) to the locking position 40 (FIG. 6), the pressing element 54 is simultaneously moved from the release position 48 to the clamping position 50. Therefore, the assembly effort is reduced and the ribbon cable connector is more user-friendly.

For example, as shown in FIG. 6, the pressing element 54 may have teeth 70 projecting from the secondary latch 34, in particular from an end face 68 of the secondary latch 34, wherein the teeth 70 are spaced apart from each other substantially parallel to the transverse direction T and, at least in the clamping position 50, are arranged in line in the plugging direction S with the respective partition walls 20. Accordingly, the pressing element 54 may be adapted to be substantially comb-shaped, with the teeth 70 pressing the insulation 8 of the ribbon cable 4 against the counter-holder element 60 in the clamping position 50. The counter-holder element 60 is formed here by an outer wall 72 of the ribbon cable connector 1.

In this second exemplary configuration, the partition walls 20 do not extend across the region 30 to allow access by the teeth 70 to the insulation 8 of the ribbon cable 4 in the clamped condition. Each of the teeth 70 may be received between two partition walls 20 in the receiving pocket 32 when latched.

The first and second exemplary configurations show a ribbon cable connector 1 integrally formed as a monolithic component 73. The production of the ribbon cable connector 1 as a monolithic component 74 allows a simple and cost-effective fabrication, especially in high volumes. For example, the ribbon cable connector 1 may be a 3D printed or injection molded part.

However, the ribbon cable connector 1 can also be configured as a multi-part, in particular two-part component 74, which permits simple and cost-effective replacement of individual components. Exemplary configurations of a ribbon cable connector 1 as a two-part component 74 are described in more detail below with reference to FIGS. 7 and 8 (third exemplary configuration) and FIGS. 9 and 10 (fourth exemplary configuration).

In particular, the pressing element 54 may be subjected to a high load to exert the necessary clamping force on the ribbon cable 4. Therefore, the pressing element 54 is a separate component 76 which is configured to be attached to a housing 78 of the ribbon cable connector 1. In particular, the pressing element 54 can be repeatedly attachable, which ensures that the pressing element 54 can be easily replaced. This allows rapid and cost-effective replacement of the individual components in the event of damage.

Another advantage resulting from the two-part structure of the cable connector 1 is the possibility of optimizing the individual components for their individual tasks. For example, the pressing element 54 can be formed from a material with a high rigidity, which makes it possible to avoid undesirable deformation of the pressing element 54.

Figure 8:
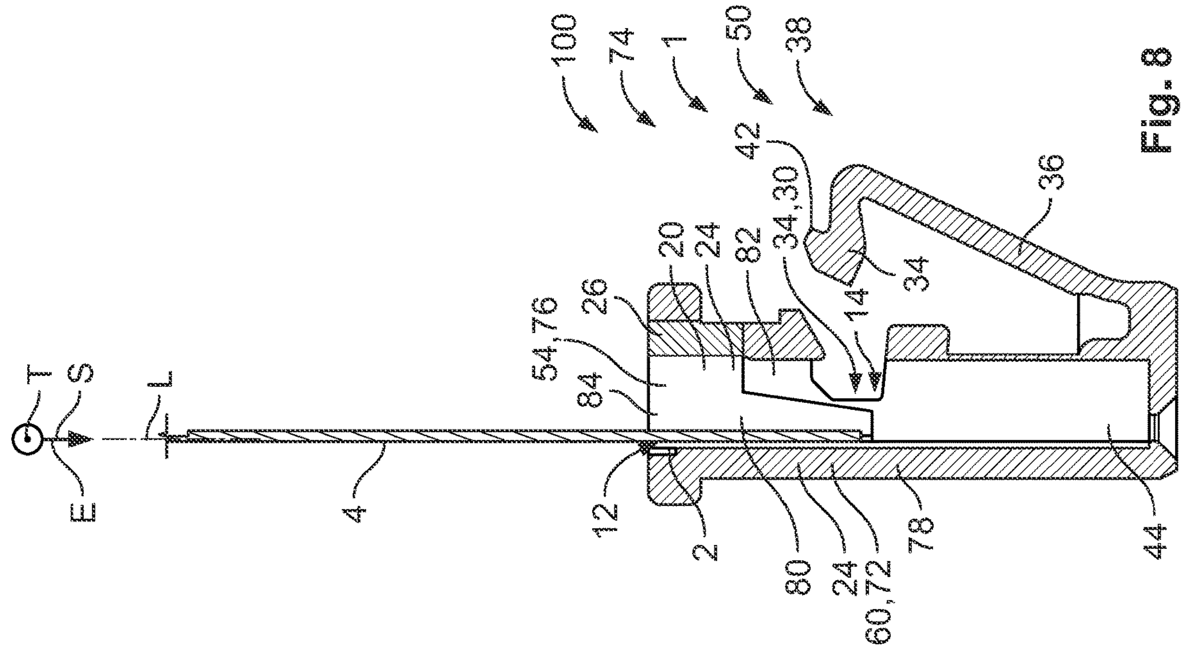
FIG. 8 is a sectional side view of the connector assembly of FIG. 7 in a clamping state.
Figure 7:
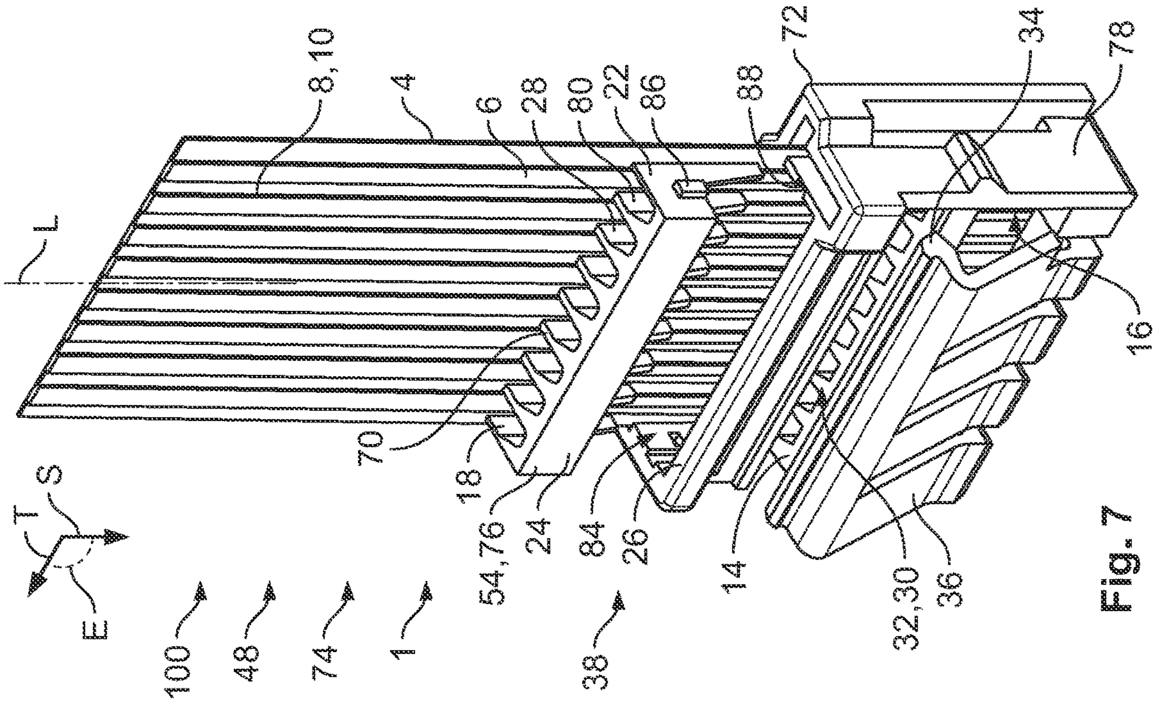
FIG. 7 is a perspective view of a connector assembly according to another embodiment in a release position.

In the third exemplary configuration shown in FIGS. 7 and 8, the pressing element 54 is provided with portions 80 of the partition walls 20 which, at least in the clamping position 50, are assembled with complementary portions 82 to the partition walls 20 formed in the housing 78.

As can be seen in FIG. 7, the pressing element 54 may be configured to be substantially comb-shaped, with a base extending parallel to the transverse direction T and the portions 80 of the partition walls 20 projecting from the base transversely to the frontal plane E.

A receptacle 84 can be formed in the housing 78, as shown in FIGS. 7 and 8, which is configured to receive the pressing element 54 at least in the clamping position 50 in the plugging direction S. Accordingly, the pressing element 54 can be movable relative to the housing 78 substantially parallel to the plugging direction S. A guiding of the relative movement between the pressing element 54 and the housing 78 can be implemented by a tongue-and-groove connection. For this purpose, tongues 86 can project in the transverse direction T on the respective outer surfaces of the pressing element 54, which can be inserted in a corresponding groove 88 formed on a side wall of the receptacle 84. The pressing element 54 and the housing 78 are connected to one another in a form-fitting and/or force-fitting manner at least in the clamping state 50. Alternatively or additionally, the pressing element 54 can be locked in a force-fitting manner in the clamping state 50.

In FIG. 7, the ribbon cable connector 1 is shown in the release position 48, in which the pressing element 54 is arranged outside the receptacle 84. Accordingly, the ribbon cable 4 can be inserted into the insertion slot 12 without great frictional resistance. If the pressing element 54 is now moved into the receptacle 84 substantially parallel to the plugging direction S, the portions 80 press the insulation 8 against the outer wall 72 and clamp the ribbon cable 4.

The complementary sections 82 may include a guiding that presses at least a part of the portions 80 in a direction transverse to the frontal plane E toward the outer wall 72, thereby reducing the clear width of the insertion slot 12 in the clamping position 50. Consequently, the movable pressing element 54 can be moved from the release position 48 to the clamping position 50 without high frictional resistance. Furthermore, the guiding holds the pressing element 54 in the clamping position 50 between the ribbon cable 4 and the complementary portions 82 in a force-fit manner.

In another embodiment not shown, the pressing element 54 may be locked in the clamping position 50 and/or in the release position 48, for example, by a latching mechanism. Thus, the pressing element 54 may be latched to the housing 78 in the release position 48, which may prevent loss of the pressing element 54. In this context, the pressing element 54 may protrude out of the receptacle 84 such that the portion 80 is not pushed toward the outer wall 72 by the complementary portion 82.

In an embodiment, in the clamping position 50, the pressing element 54 may be located entirely within the receptacle 84, whereby the clamping position 50 may be uniquely characterized. In particular, a surface of the pressing element 54 extending substantially perpendicular to the plugging direction S can be aligned with a surface of the housing 78 in the clamping position 50.

Figure 9:
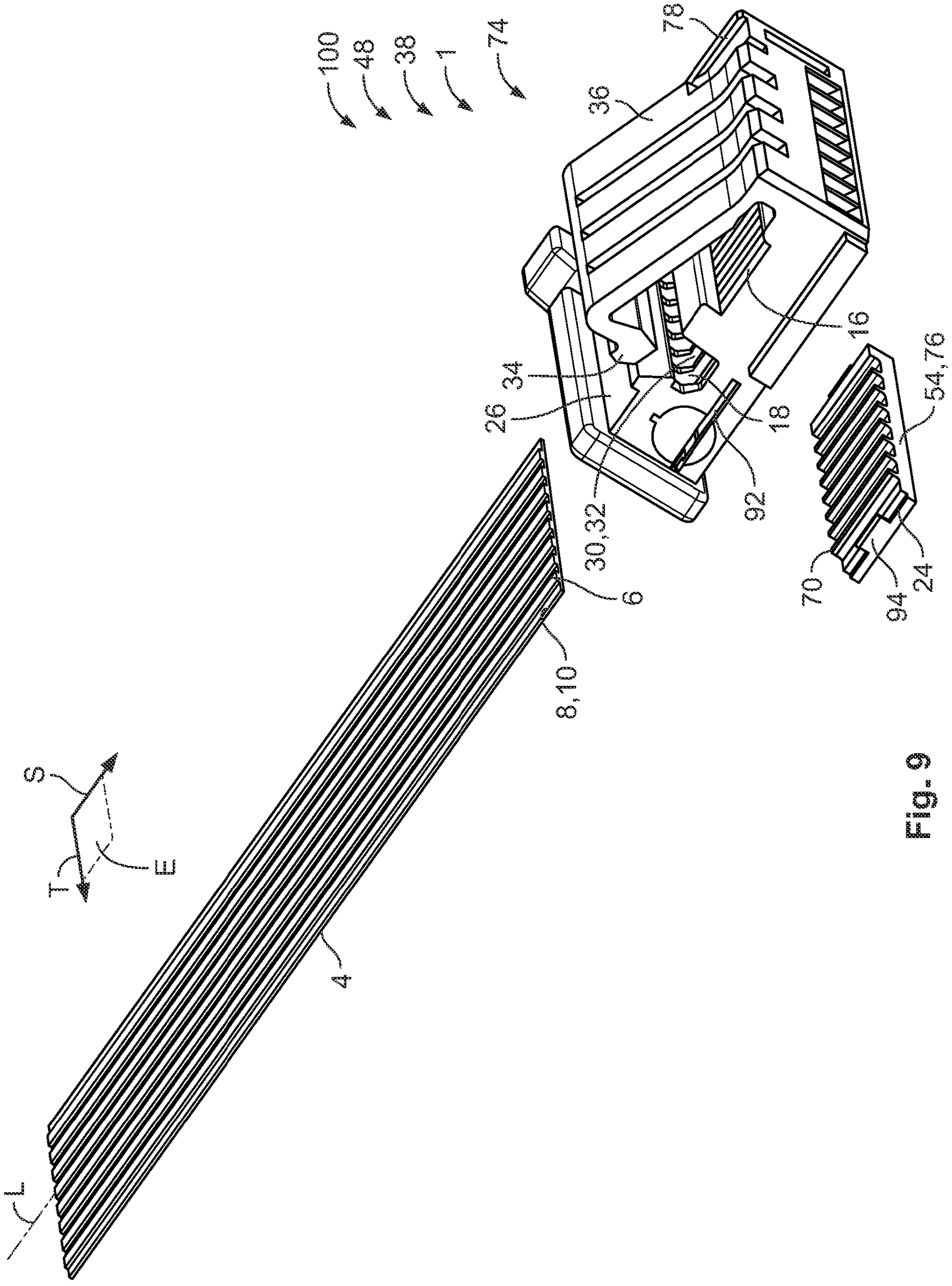
FIG. 9 is a perspective view of a connector assembly according to another embodiment in a release position.
Figure 10:
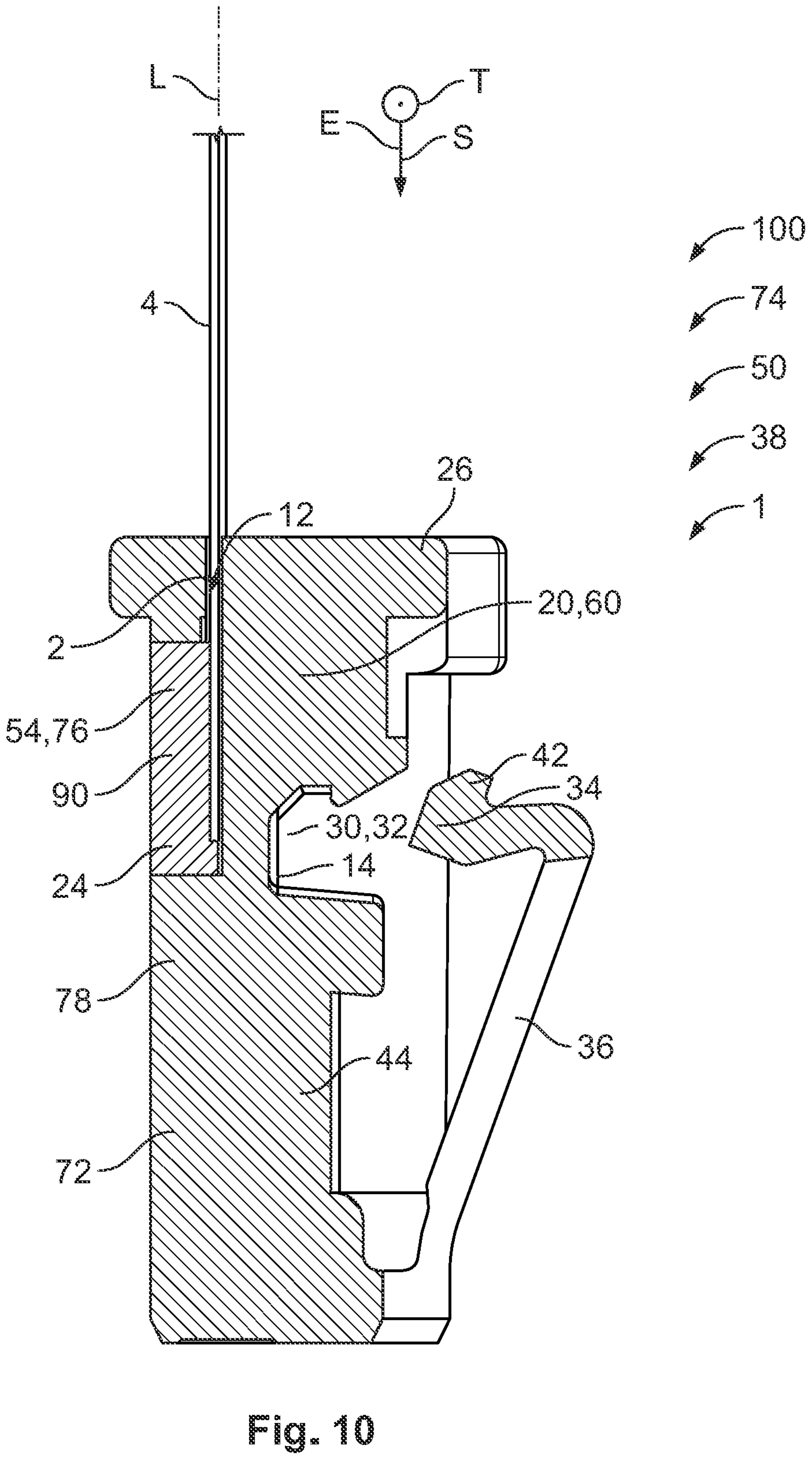
FIG. 10 is a sectional side view of the connector assembly of FIG. 9.

In the fourth exemplary configuration shown in FIGS. 9 and 10, the partition walls 20 form the counter-holder element 60 analogously to the first exemplary configuration and are part of the housing. The outer wall 72 is penetrated by a window 90 in a region opposite the partition walls 20 with respect to the insertion slot 12, into which the pressing element 54, configured as a separate component 76, can be inserted. For this purpose, a frame of the window 90 can be provided with a latching receptacle 92, for example in the form of a slot, in which a latching hook 94 of the pressing element 54 engages at least in the clamping position 50. The latching receptacle 92 can be accessible from the outside, whereby it is possible, for example, to press the latching hook 94 out of the latching receptacle 92 using a tool.

As can be seen in FIG. 10, in the clamping position 50, the pressing element 54 can completely fill the window so that a surface of the outer wall 72 facing away from the insertion slot 12 is flush with a surface of the pressing element 54 facing away from the insertion slot 12.

In the fourth exemplary configuration, the pressing element 54 may also be substantially comb-shaped, and the teeth 70 may be arranged directly opposite the partition walls 20, at least in the clamping position 50.

What is claimed is:

1. A ribbon cable connector fixed at an end of a ribbon cable having one or more individual conductors, comprising:

an insertion slot extending in a single plane along a plugging direction and receiving the ribbon cable, the ribbon cable having a plurality of electrical conductors extending parallel and distanced to one another;

a plurality of contact element receptacles extending parallel and distanced to one another, an end of the insertion slot inside of the ribbon cable connector adjoins the contact element receptacles in the plugging direction;

the insertion slot configured to receive an individual conductor and including one more partition walls projecting in the plugging direction and extending as far as the contact element receptacles; and a clamping device configured to clamp the ribbon cable in the insertion slot, wherein the combination of the clamping device and the partition walls securely fix the ribbon cable in the insertion slot.

2. The ribbon cable connector of claim 1, wherein the clamping device extends over an entire width of the insertion slot transversely to the plugging direction.

3. The ribbon cable connector of claim 1, wherein a material thickness of the partition wall increases in a direction transverse to the plugging direction.

4. The ribbon cable connector of claim 1, wherein the insertion slot and the contact element receptacles are spaced apart from one another in the plugging direction.

5. The ribbon cable connector of claim 4, wherein the insertion slot between the contact element receptacles is open transversely to the plugging direction.

6. The ribbon cable connector of claim 4, wherein the clamping device is arranged between the contact element receptacles.

7. The ribbon cable connector of claim 1, wherein the partition wall extends in the plugging direction up to the contact element receptacles.

8. The ribbon cable connector of claim 7, wherein the partition wall is narrowed in a region between the contact element receptacles.

9. The ribbon cable connector of claim 1, wherein the partition wall is part of the clamping device.

10. The ribbon cable connector of claim 1, wherein the clamping device has a pressing element movable from a release position into a clamping position.

11. The ribbon cable connector of claim 10, wherein the pressing element is lockable in the clamping position.

12. The ribbon cable connector of claim 10, wherein a clear width of the insertion slot is smaller in the clamping position than in the release position.

13. The ribbon cable connector of claim 10, wherein the pressing element has a comb-shaped design.

14. The ribbon cable connector of claim 10, wherein a counter-holder element of the clamping device opposite the pressing element in the clamping position with respect to the insertion slot has a comb-shaped design.

15. The ribbon cable connector of claim 10, wherein the pressing element is movable parallel and/or transversely to the plugging direction.

16. The ribbon cable connector of claim 1, wherein the clamping device extends in the plugging direction over at least half a depth of the insertion slot.

17. The ribbon cable connector of claim 1, wherein the ribbon cable is integrally formed as a monolithic component.

18. The ribbon cable connector of claim 1, wherein the ribbon cable connector is a two-part component.

19. A connector assembly, comprising:

a ribbon cable having a plurality of individual electrical conductors running parallel to and distanced to one another; and a ribbon cable connector including an insertion slot extending in a single plane plugging direction and receiving the ribbon cable, a plurality of contact element receptacles extending parallel and distanced to one another, an end of the insertion slot inside of the ribbon cable connector adjoins the contact element receptacles in the plugging direction, the insertion slot configured to receive an individual electrical conductor and including one more partition walls narrowing transversely to the plugging direction, and projecting in the plugging direction and extending to the contact element receptacles, and a clamping device clamping the ribbon cable in the insertion slot in a region between the electrical conductors, wherein the combination of the clamping device and the partition walls securely fix the ribbon cable in the insertion slot.

* * * * *